United States Patent
Heitmann et al.

[11] 3,856,401
[45] Dec. 24, 1974

[54] APARATUS FOR NO-CONTACT MEASUREMENT USING AN OSCILLATING GRATING

[75] Inventors: Knut Heitmann; Eckart Schneider, both of Wetzlar, Germany

[73] Assignee: Ernst Leitz GmbH, Wetzlar, Germany

[22] Filed: Feb. 20, 1973

[21] Appl. No.: 333,514

[30] Foreign Application Priority Data
Mar. 1, 1972  Germany............................ 2209667

[52] U.S. Cl....................... 356/28, 356/4, 356/156, 250/237 G
[51] Int. Cl. ............................................. G01p 3/36
[58] Field of Search ............. 356/28, 167, 169, 156, 356/4; 250/237 G

[56] References Cited
UNITED STATES PATENTS

| | | | |
|---|---|---|---|
| 3,482,107 | 12/1969 | Hock | 356/169 |
| 3,486,032 | 12/1969 | Cufflin | 356/28 |
| 3,511,150 | 5/1970 | Whitney et al. | 356/28 |

FOREIGN PATENTS OR APPLICATIONS

| | | | |
|---|---|---|---|
| 1,249,302 | 10/1971 | Great Britain | 356/28 |

*Primary Examiner*—Maynard R. Wilbur
*Assistant Examiner*—S. C. Buczinski
*Attorney, Agent, or Firm*—Krafft & Wells

[57] ABSTRACT

Apparatus for the no-contact measurement of the velocity or the path of objects without special optical markers with respect to a reference position in one or two coordinate directions, with imaging of the object onto a grating and measurement of the light flux leaving this grating means of photoelectric elements. The output signals of the photoelectric elements exhibit a frequency component proportional to the motion velocity. The grating effective as a correlator and position frequency filter is disposed in the proximity of the imaging plane of an objective and this grating is associated, per coordinate, with preferably two photoelectric receivers and the output signals of these receivers are associated with the position frequency of the grating, being in push-pull relationship to one another. The present apparatus differs from the prior art in that an electrical drive means (15) is provided for the oscillatory or continuous relative movement between the object image and grating (5', 6, 25) and at right angles to the optical axis. In one embodiment, the grating has components which are three-dimensional structures triangular in cross-section. In another embodiment, the grating has photoelectric receiver parts nested in a side-by-side relationship. In yet another embodiment the electrical drive means moves the grating in a manner having components in both measuring directions, e.g. circular or linear inclined by 45° to both coordinates.

The image of the object may also be displaced relative to the grating by mobile optical means deflecting the image forming beams, e.g., by a tilted plane parallel plate or by a tilted lens rotated around the optical axis by an electric motor or by rotating or oscillating beam deflecting means as disclosed in German Patent 1 233 614 of Frenk and 1 213 141 German Published Application of Frenk.

8 Claims, 7 Drawing Figures

Patented Dec. 24, 1974

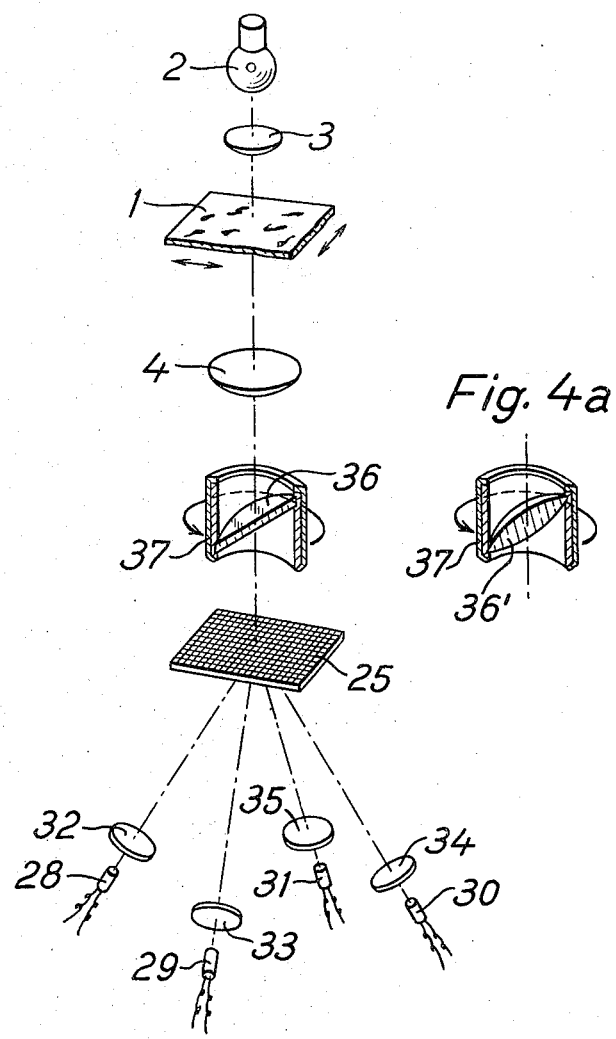

APPARATUS FOR NO-CONTACT MEASUREMENT USING AN OSCILLATING GRATING

CROSS REFERENCES TO RELATED APPLICATIONS

Applicants claim priority under 35 U.S.C. 119 for application Ser. No. P 22 09 667.9, filed Mar. 1, 1972 in the Patent Office of the Federal Republic of Germany.

The disclosure of U.S. application Ser. No. 283,967, filed Aug. 28, 1972, of Heitmann et al. and having the same assignee as the present invention is incorporated herein. The application of Heitmann et al discloses the state of the art of apparatus for no-contact measurement and particularly discloses the use of a pyramidal grating, the method for converting the position frequency into a speed proportional time frequency, how the magnitude and direction is determined from the grating movement, the electronic circuitry used, how the magnitude and/or velocity are obtained, and how the push-pull signals are evaluated.

BACKGROUND OF THE INVENTION

The present invention relates to a device for the no-contact measurement of the speed or path of objects without special optical markers with respect to a reference position in one or two coordinate directions.

Optical speed measuring devices are known wherein relative movements of an object with respect to a photoelectric receiver produce measuring variables dependent on the relative velocity. In this connection, different methods are basically employed.

On the one hand, the object involved in the measurement can be irradiated with a monochromatic coherent radiation; then, the light scattered on the object is collected, the frequency of this light being influenced due to Dopper shift; and then, the frequency of the scattered light is measured by interference with the primary radiation or with light frequency shifted in the opposite direction. This conventional process requires an expenditure in apparatus which in many cases is intolerable, due to the required lasers and interferometers.

On the other hand, the moved object can be imaged into an image plane wherein at least two photoelectric scanners are disposed which are offset in the direction of movement. The signal of the first scanner disposed as the first one in the direction of movement is stored for a preselected time $\tau$ in a short time storage unit and thereafter compared, in a correlator, with the signal delivered by the subsequent, second scanner displayed by the path c. In this connection, the storage time $\tau$ is controlled so that the signal of the second scanner is chronologically congruent with the delayed signal of the first scanner. Then, the speed $V_o'$ of the object image relative to the scanners is the result, and by means of this result, via the imaging (reproduction) scale, the velocity $v_o$ of the object is obtained, as $$v_o = k \cdot v'_o, \quad v'_o = c/\tau, \quad k: \text{reproduction scale factor.}$$

This conventional method requires, with a controllable storage means and a correlator, a complicated, trouble-prone expenditure in apparatus and merely yields a median velocity averaged over the storage time $\tau$.

Finally, the moving object can be imaged on a grating having a number of lines $k$ per mm., behind which a photoelectric receiver receives the light emanating from the object and, preferably upon the presence of a specific position frequency in the brightness distribution of the object, emits an a.c. voltage, the frequency $f$ of which is proportional to the velocity of the object image v relative to the grating and to $k$. The following applies:

$$f = v \cdot k$$

This signal is superimposed (heterodyned) by longer period signals (constant light) in correspondence with the integral over the image proportions with position frequencies which do not correspond to $k$. For the suppression of this constant light proportion, a device is known with a special pair of photoelectric receivers with telescoped, strip-shaped electrodes. This device yields a push-pull signal only from image components having a spatial frequency corresponding to $k$, the in-phase proportions of other signals being cancelled out by a difference-forming bridge circuit. The specific photoelectric receivers of this conventional arrangement again cause a high cost expenditure, due to their difficult geometry, and they limit the number of strips, since these receivers cannot be manufactured at any desired fineness. The number of strips, in turn, is directly connected with the measuring accuracy of the system.

Finally, a device for compensating the movement of an image in an aerial camera during the exposure time is known wherein control signals are derived by means of a gable roof-like or pyramidal grating and photoelectric receivers connected thereafter. These control signals readjust the film in the camera or the imaging optical system of this camera in such a manner that an object to be photographed is always at the same point of the film during the exposure time. This conventional device does not provide any directional information, so that the use thereof is possible only in a predetermined direction of motion.

SUMMARY OF THE INVENTION

The present invention is based on the problem of providing a device for the no-contact measurement of the velocity of objects without special optical markers with respect to a reference position along the lines of the last-mentioned conventional device, by means of which, in an extremely simply manner, directional information data is obtained corresponding to two intersecting coordinate directions. In this connection, it is to be noted that the novel device is readily realized by means of commercially available optical and electronic components.

The present invention relates to a device of the type mentioned in the foregoing with imaging of the object onto a grating and measurement of the light beam leaving this grating by means of photoelectric units, wherein a grating is disposed in the imaging beam path in proximity to the imaging plane of the objective, as a correlator and position frequency filter. This grating exhibits three-dimensional structures which are triangular in cross section and are disposed side-by-side in a line arrangement; and wherein this grating is associated with preferably two photoelectric receivers, the output signals of which, due to the geometrical configuration of the grating, are in push-pull relationship with respect to one another, for the position frequency of the grating. This device is distinguished in that an electrical drive means is provided for the oscillatory or continuous movement of the grating at right angles to the optical axis. The drive operation is executed, with the use of a cross grating, in such a manner that the movement takes place preferably in parallel to the diagonal of the grating elements. With the use of a single coordinate gable roof-like grating, the movement takes place preferably at right angles to the optical axis and to the roof edges. Such a gable roof-like grating is disclosed in British Patent 1,249,302 of Peter Gardner.

BRIEF DESCRIPTION OF THE DRAWINGS

Embodiments of the novel device are schematically illustrated in the drawings and are described hereinbelow, to wit:

FIG. 4 shows a device for measuring in two directions with a tilted plane parallel plate; and FIG. 4a shows a tilted lens for use in the device of FIG. 4.

DESCRIPTION OF THE PREFERRED EMBODIMENTS

Figure 1:
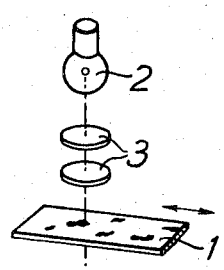
FIG. 1 shows a device for measuring in one coordinate direction.

In FIG. 1, numeral 1 denotes a moving transparent object, the relative velocity of which is to be measured in transmitted light (transillumination). This object 1 is illuminated by a lamp 2 via a condenser 3. An objective 4 images the object 1 into the plane of a grating 5. This grating 5 is fashioned as a ruled (grooved) grating having a triangular cross section 6 of the rulings. Due to the fact that the flanks of the grating rules have alternatingly non-uniform inclinations, an energy division is produced between image points mutually offset by half a grating constant, due to the differing light deflection of proximate flanks. The energy of respectively one deflection direction is fed, via condensers 8, 9, to respectively one of the photoelectric receivers 10, 11.

Since the structure of the object, as indicated by dark zones on the object 1, allows the light to be transmitted in different degrees of strength, the output signals of the photocells 10, 11 contain variable proportions in correspondence with the chronological variation of the brightness distribution in the plane of the grating 5 due to the movement of the object 1. By the superposition of the object structure with the structure of the grating, those proportions of the image structure are filtered out, the position frequency of which corresponds to the grating constant. In this connection, additional image proportions of a lower frequency are passed through as an interfering equal light proportion. The same holds true for image points offset by half a grating constant, but with the difference that only the position frequency corresponding to the grating constant is shifted in phase by 180° with respect to the first-mentioned position (tracking) signal. By a subsequent formation of the difference between the electrical signals obtained from the two image proportions, an elimination of the in-phase light proportions and an addition of the opposite-phase signal proportions of the filtered-out position frequency are obtained. Upon a movement of the object relative to the pattern of the grating, the position frequency is then, as is known, converted into a velocity-proportional temporal frequency, and measured.

The grating 5 is arranged to be displaceable in the direction of the arrow. An electrical drive means 15, illustrated in dashed lines in the drawing, makes it possible to move the grating in a defined manner relative to the optical axis. If this is done, a temporal frequency is obtained at the output of the receivers also in case of a stationary position of the object. This frequency, depending on the direction of movement of the object, is proportional either to the sum or to the difference of the object velocity and the grating velocity.

From these signals, the magnitude and direction of the movement of the object can be determined in a conventional manner by comparison with a signal derived only from the movement of the grating (e.g. by means of a phase-sensitive rectifier). If the position is to be measured, the number of the periods passed (cycles) at the output of the comparator must be counted, taking into account the directional information which is likewise present.

Figure 2:
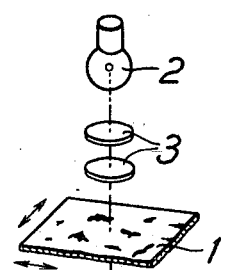
FIG. 2 shows a device for measuring in two coordinate directions.
Figure 1A:
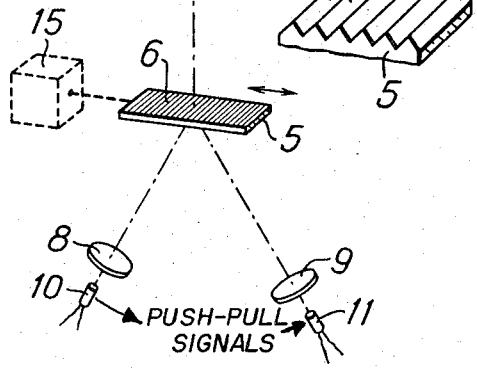
FIG. 1a is a detailed showing of a portion of the grating used in FIG. 1.

In FIG. 2, a modification of the device of FIG. 1 is illustrated. In this figure, identical reference numerals denote the same components. The grating 25, however, is constructed in this modification of identical pyramids 27 disposed, with the edges of their bases, in parallel and side-by-side relationship. These pyramids are disposed redundantly on a support (carrier) 26. Two pairs of directions are defined in the plane of the grating by the normal lines of the pyramidal surfaces, and four photoelectric receivers 28–31 with four condensers 32–35 are associated with these pairs of directions. It is thus possible to effect a measurement in the grating plane in two directions which are not parallel to each other, by means of this grating. Moreover, with the aid of this grating arrangement, a pair of push-pull signals is obtained for each coordinate direction, making it possible in the above-described manner to eliminate in phase light proportions from the measuring signals thus obtained.

As indicated above, a drive 15 is also provided in this arrangement. This drive, however, is different from the illustration of FIG. 1 and engages the movably disposed grating 25 so that the latter is moved at right angles to the optical axis and preferably in the direction of the diagonal of its grating elements. From this movement, in the manner already described above, direction defining signals are derived, namely for each of the coordinate directions predetermined by the arrangement of the grating elements.

It is, of course, possible to replace the photoelectric receivers associated with a respective coordinate direction by a single photoelectric receiver which is alternatingly associated with the two directions of the beams leaving the grating, for example by means of an oscillating mirror.

Figure 3:
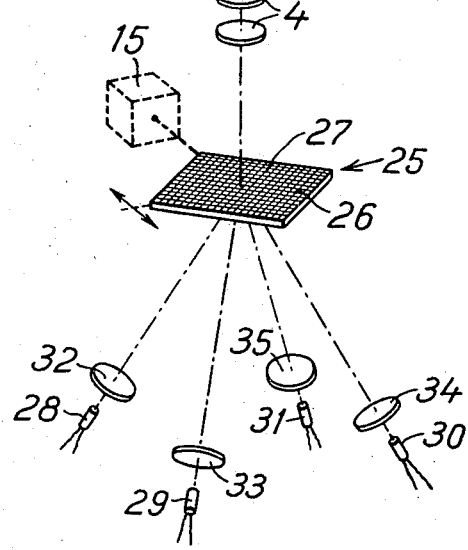
FIG. 3 shows a device for measuring in one direction with a grating consisting of strip-shaped photoelectric receivers.
Figure 3:
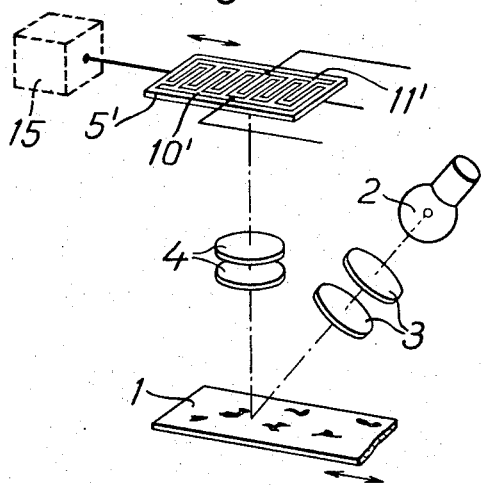
Figure 2A:
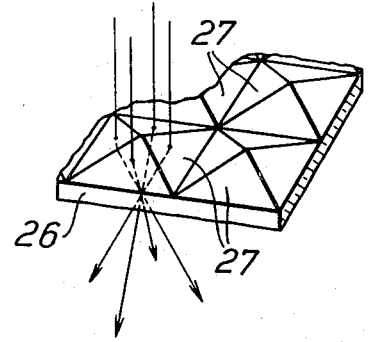
FIG. 2a is a detailed showing of a portion of the grating used in FIG. 2.

For the measurement of objects having preferably coarse features of a low position frequency, it is possible, for example, to employ an arrangement with a grating 5', the strips of which are nested parts of two photoelectric receivers 10', 11', as shown in FIG. 3. Such a grating 5' is disclosed in U.S. Pat. No. 3,084,301, of L. Mohan. The strips of the receivers 10' and 11' are arranged so that they alternate with each other, and the output signals of these receivers are connected differentially. Otherwise, this arrangement is constructed as shown in FIG. 1. Upon a movement of the grating 5' by means of the drive 15, electrical signals are produced in the two receivers which are in a push-pull relationship to one another. Upon an additional movement of the object 1, the frequency of these electrical signals is subjected to a frequency modulation, from which the magnitude and direction of the object velocity can be determined.

In the modification of the device from FIG. 2 as illustrated in FIG. 4 again identical reference numerals denote the same components. The grating 25, however, is arranged fixedly in this modification. A relative motion between the image of the object 1, illuminated by a lamp 2 via a condensor 3 and the grating 25 is accomplished in this arrangement by a tilted plane parallel plate 36 fixed in a support 37. This support 37 is rotated around the optical axis in a known manner. From this rotation a reference signal is obtained to determine motions of the object 1 by the deviations of the modulation of the electrical output signals from its harmonic form, this form appearing only with a fixed object position.

The titled plane parallel plate 36 can be replaced by the tilted lens 36' as shown in FIG. 4a.

We claim:

1. In an apparatus for the no-contact measurement of the velocity or the path of objects without special optical markers with respect to a reference position in one or two coordinate directions, having imaging means with an aperture giving an image of the object onto a grating, said grating exhibiting a plurality of divisional markers geometrically dividing the object-image into at least two object-image components localized in defined aperture image planes, each image of the aperture being associated with at least one photoelectric receiver means, said receiver means generating output signals having a frequency component proportional to the motion velocity, said grating effective as a correlator and spatial frequency filter disposed in the proximity of the objective-imaging plane and associated, per coordinate, with at least two of said photoelectric receiver means, the output signals of these receiver means being in push-pull relationship to one another, the improvement comprising:

electrical drive means (15) providing oscillatory or continuous relative movement between said object image and said grating (5',6,25).

2. The apparatus of claim 1, wherein said drive means drives said grating at right angles to the optical axis and at right angles to the direction of the divisional markers, the grating being a single coordinate grating.

3. The apparatus of claim 1, wherein said aperture comprises mobile optical means, said drive means moves said mobile optical means and said grating is stationary.

4. The apparatus of claim 3, wherein said mobile optical means is a tilted plane parallel plate.

5. The apparatus of claim 3, wherein said mobile optical means is a tilted lens.

6. In an apparatus for the no-contact measurement of the velocity or the path of objects without special optical markers with respect to a reference position in one or two coordinate directions, having imaging of the object onto a grating and measurement of the light flux leaving this grating by means of photoelectric elements, said photoelectric elements generating output signals having a frequency component proportional to the motion velocity, said grating effective as a correlator and position frequency filter disposed in the proximity of the objective imaging plane and said grating associated, per coordinate, with a plurality of photoelectric receivers and the output signals of these receivers being associated with the position frequency of the grating, in push-pull relationship to one another, the improvement comprising:

said grating having markers which are three dimensional structures and triangular in cross section, and electrical drive means (15) providing oscillatory or continuous relative movement between said object image and said grating (5',6,25) and at right angles to the optical axis.

7. In an apparatus for the no-contact measurement of the velocity or the path of objects without special optical markers with respect to a reference position in one or two coordinate directions, having imaging of the object onto a grating measurement of the light flux leaving this grating by means of photoelectric elements, said photoelectric elements generating output signals having a frequency component proportional to the motion velocity, said grating effective as a correlator and position frequency filter disposed in the proximity of the objective imaging plane and said grating associated, per coordinate, with a plurality of photoelectric receivers and the output signals of these receivers being associated with the position frequency of the grating, in push-pull relationship to one another, the improvement comprising:

said grating (5') having markers constructed of parts of photoelectric receivers (10',11'), said parts disposed in a nested, side-by-side relationship, and electrical drive means (15) providing oscillatory or continuous relative movement between said object image and said grating (5',6,25) and at right angles to the optical axis.

8. In an apparatus for the no-contact measurement of the velocity or the path of objects without special optical markers with respect to a reference position in one or two coordinate directions, having imaging of the object onto a grating and measurement of the light flux leaving this grating by means of photoelectric elements, said photoelectric elements generating output signals having a frequency component proportional to the motion velocity, said grating effective as a correlator and position frequency filter disposed in the proximity of the objective imaging plane and said grating associated, per coordinate, with a plurality of photoelectric receivers and the output signals of these receivers being associated with the position frequency of the grating, in push-pull relationship to one another, the improvement comprising:

electrical drive means (15) providing oscillatory or continuous relative movement between said object image and said grating (5',6,25) and at right angles to the optical axis, and said grating is a cross grating (25) having crossed divisional markers with said drive means connected thereto moving said grating in a manner having components in two measuring directions.

* * * * *